June 15, 1926.
M. F. JONES
MOTOR CONTROL SYSTEM
Filed April 27, 1922
1,588,586
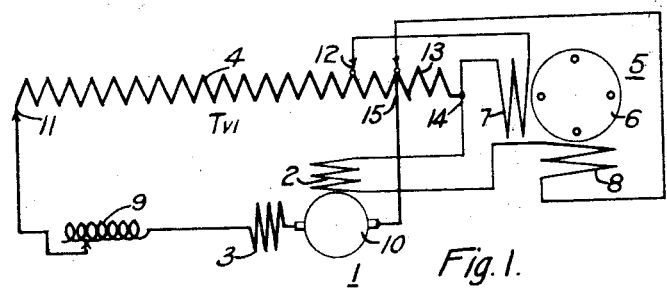
Fig. 1.
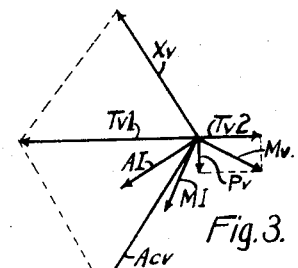
Fig. 3.
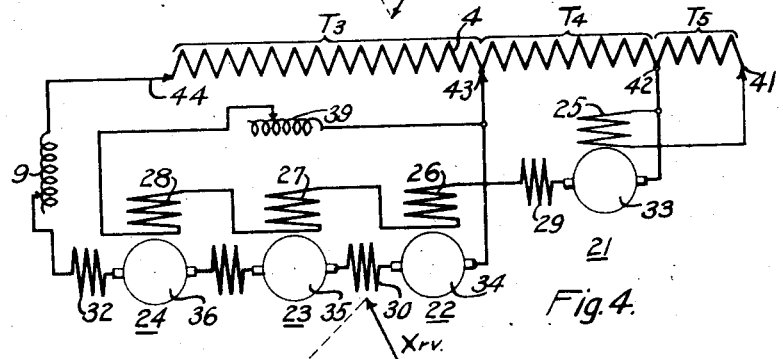
Fig. 4.
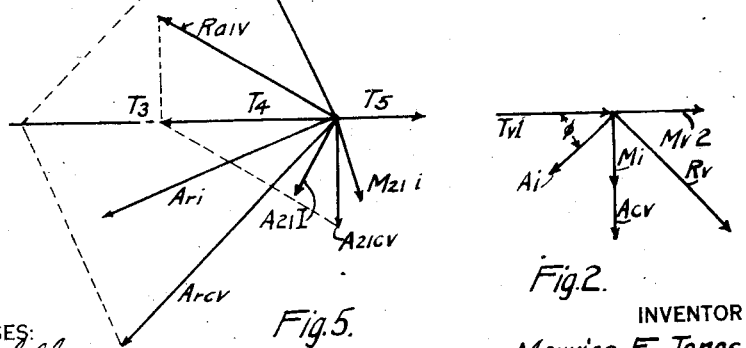
Fig. 5.
Fig. 2.
WITNESSES:
INVENTOR
Maurice F. Jones.
BY
ATTORNEY Patented June 15, 1926.

1,588,586

UNITED STATES PATENT OFFICE.

MAURICE F. JONES, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed April 27, 1922. Serial No. 556,823.

My invention relates to motor-control systems and it has particular relation to control systems for governing one or more single-phase commutator motors during regeneration.

One object of my invention is to provide a system of regeneration for a single-phase alternating-current motor, whereby the regenerative current therefrom has a relatively high power-factor and thus does not materially reduce the power factor of the current traversing the main source of supply, such for example, as an overhead trolley system—at the same time securing a relatively great braking torque by the motor.

Another object of my invention is to secure substantially constant torque at all operative speeds for one or more alternating-current single-phase commutator motors during regeneration.

Another object of my invention is to provide a control system which is so designed that the operator may vary the power regenerated by the motor in accordance with the operating condition to which the motor is subjected during regeneration.

Still another object of my invention is to provide a control system for a single-phase commutator motor that shall be simple and economical of construction and positive and reliable in operation, both during motoring and regenerative periods.

Another object of my invention is to provide a control system that employs the field-magnet windings of one or more motors to serve as reactance devices in series relation with the armature of another single-phase commutator motor during the regenerative period and, at the same time, perform their normal function of exciting the field-magnet winding of the first-named motors.

Briefly speaking, my invention comprises inserting a reactance device in series relation with the armature of a single-phase commutator motor and employing some energy-varying device in circuit with the field-magnet winding of the same motor to cause the current traversing the winding, and hence the flux thereof, to lag behind the single-phase voltage of the source of supply by more than ninety electrical degrees, preferably about 120°.

My invention also comprises connecting one or more field-magnet windings of a group of motors in series relation with the armature of a single-phase commutator motor, and connecting the armatures of the same group of motors in series relation with one or more reactance devices during the period of regeneration to secure a high power-factor of the current regenerated thereby.

For a better understanding of my invention, reference may be made to the accompanying drawing—

Figure 1 of which is a motor-control system constructed in accordance with my invention;

Figs. 2 and 3 are vector diagrams of the phase relations of the electromotive forces acting upon the motor that is illustrated in Fig. 1 of the drawing, during regeneration;

Fig. 4 is a diagrammatic view of a plurality of motors that are governed by a modified form of control system constructed in accordance with my invention; and Fig. 5 is a vector diagram of the electromotive forces acting upon the motors of the control system that is illustrated in Fig. 4 of the drawing.

Referring to Fig. 1 of the drawing, a motor 1, having a main or torque field-magnet winding 2 and a compensating field-magnet winding 3, is normally energized, during motoring, by energy supplied from a suitable transformer, only the secondary winding 4 of which has been illustrated. The energization of the main field-magnet winding 2 of the motor 1 is governed by a phase converter 5 having a rotor 6, a primary winding 7 and a secondary winding 8. An adjustable inductive reactance device 9 is connected in series relation with the armature 10 of the motor 1.

One terminal of the reactance device 9 is adjustably connected, by means of a switching device 11, to the secondary winding 4 of the main transformer. The energization of the primary winding 7 of the phase-converter 5 may be varied by means of a switching device 12 that connects the winding 7 to the secondary winding 4 of the main transformer. The energization of the secondary winding 8 of the phase-converter 5 may be varied by means of an adjustable switching device 13 that connects one terminal of the winding 8 to the secondary winding 4 of the main transformer and also by varying the energization of the winding 7 of the phase converter. One terminal of the armature 10 of the motor 1 may be adjustably connected to the secondary winding 4 of the main transformer by means of a switching device 15.

Reference may be made now to the vector diagram of Fig. 2, for the purpose of explaining how the torque of the motor 1 is maintained substantially constant during regeneration, if the connections of the motor to the secondary winding 4 of the main transformer are unchanged. If the phase-converter 5 is rendered inoperative by the deenergization of the primary winding 7, and the main field-magnet winding 2 of the motor 1 is connected directly across that portion of the secondary winding 4 of the main transformer that is between the switching devices 13 and 14, then the voltage across the winding 2 will be considered, for the purpose of illustration, as being equal to the vector $Mv2$. The current traversing the winding 2 will be at right angles to this voltage and is represented by the vector marked $Mi$, the ohmic and iron losses of the motor being omitted. The magnetic flux of the main field-magnet winding 2 will be, of course, in phase with the current traversing the winding and is also represented by the same vector. The counter-voltage of the armature 10 will be in phase with the magnetic flux $F$ of the main field-magnet winding 2 of the motor 1 and is illustrated by the vector $Acv$.

The resultant $Rv$ of the armature voltage $Acv$ and the voltage across that portion of the main transformer secondary winding 4 between the switching devices 11 and 15, which has been illustrated by the vector $Tv1$, will be at right angles to the current $Ai$ traversing the armature 10 of the motor 1 when a reactance device 9, having a reactance value $X$, is connected in series relation with the armature 10. The angle $\phi$ between the current traversing the armature 10 and the voltage of the secondary winding 4 of the main transformer represents the phase relation of the regenerative current to the line voltage. Since the voltage $Mv2$ of the field-magnet winding 2 is presumed to be constant, the magnetic flux $F$ thereof is constant. The torque $T$ of the motor 1 during regeneration will equal the constant $F \times Ai \times \sin \phi$. The current $Ai$ traversing the armature 10 of the motor 1 equals $$Ai = \frac{\sqrt{Tv1^2 + Acv^2}}{X}$$

where $X$ is the reactance of the reactance device 9, the impedance of the armature 10 being neglected.

$$\sin \phi = \frac{Tv1}{\sqrt{Tv1^2 + Acv^2}}$$

Substituting these values for $Ai$ and $\sin \phi$ of the equation $$T = (\text{constant } F) Ai \sin \phi,$$

we have $$T = \text{const. } F \frac{\sqrt{(Tv1^2 + Acv^2)}}{X} \times \frac{Tv1}{\sqrt{Tv1^2 + Acv^2}}$$

which equals $$T = \frac{(\text{const. flux } F) \times Tv1}{X}$$

Since the flux $F$ is directly proportional to the voltage $Mv2$ of the main field-magnet winding 2, then the torque is proportional to $$T = \frac{(\text{const. } Tv1 \times Mv2)}{X}$$

In other words, with a given constant excitation and terminal voltages applied to a single-phase commutator motor during regeneration, the torque is constant and the regenerative power is proportional to the speed, if the value of the reactance $X$ is constant. The torque of the motor 1 will vary directly as the value of terminal pressure $Tv1$ and inversely in proportion to the value of the reactance $X$.

The choke coil or inductive reactance device 9, in series relation with the armature 10 of the motor 1 also prevents the current traversing the armature from becoming excessive during current surges. Any desired braking speed may be secured by changing the switching connections of the armature 10 to the secondary winding 4 of the main transformer.

Reference may be made now to Fig. 3, which illustrates the electromotive forces acting upon the motor 1, when the phase-converter 5 is employed during regenerative braking to cause the current traversing the main field-magnet winding 2 to lag 120° out of phase with the voltage of the secondary winding 4 of the main transformer. The voltage across the primary winding 7 of the phase-converter 5 is in phase with the main transformer voltage 4. The excitation of the winding 7 induces a voltage $Pv$ in the winding 8 that is 90° behind the voltage of the transformer winding 4.

The voltage between the switching devices 13 and 14 of the secondary winding 4 of the main transformer to which the secondary winding 8 of the phase-converter 5 is connected, is illustrated by the vector $Tv2$. The resulting voltage across the main field-winding 2 of the motor 1 is the vector sum of the voltages $Tv2$ and $Pv$ and is represented by the vector $Mv$. The current $MI$ traversing the winding 2 will be substantially 90° out of phase with this voltage or approximately 120° behind the voltage of the secondary winding 4 of the main transformer.

The counter-voltage generated by the armature 10 of the motor 1 will lag slightly behind the current of the main field-magnet winding 2 because of the excitation losses, and is represented by the vector $Acv$. The current induced in the armature 10 lags slightly behind the voltage $Acv$. The voltage of the reactance device 9 will be 90° out of phase with the current traversing the armature 10 and will be substantially equal to the voltage across the terminals of the armature 10. The voltage of the reactance device 9 is represented by the vector $Xv$. The resultant of the counter-voltage $Acv$ of the armature 10 and the voltage $Xv$ across the reactance device 9 is represented by a force which is equal and opposite to the vector $Tv1$ and is, therefore, in phase with it.

The torque of the motor 1 is proportional to the product of the torque field flux, the current $AI$ and the cosine of the angle between the vectors representing the flux and current. For any given set of connections, the current $AI$ increases with speed, the flux is constant and the cosine of the angle between the current and flux vectors decreases with the speed. The torque of the motor 1 is, therefore, substantially constant with a considerable change in speed.

Referring now to Fig. 4 of the drawing, a plurality of motors 21 to 24, inclusive, are provided with corresponding main field-magnet windings 25 to 28, inclusive, compensating field-magnet windings 29 to 32, inclusive, and armature 33 to 36, inclusive. The adjustable reactance device 9 is connected in series relation with the armatures 34 to 36, inclusive, and compensating field-magnet windings 30 to 32, inclusive, of the corresponding motors 32 to 34, inclusive. The armature 33 of the motor 21 is connected in series relation with the main field-magnet windings 26 to 28, inclusive, of the corresponding motors 22 to 24, inclusive, and a reactance device 39.

The main field-magnet winding 25 of the motor 21 is adjustably connected, by means of switching devices 41 and 42, to the secondary winding 4 of the main transformer. The armature 33 of the motor 21, reactance device 39, and main field-magnet windings 26 to 28, inclusive, of the corresponding motors 22 to 24, inclusive, are connected, by means of adjustable taps 42 and 43, to the secondary winding 4 of the main transformer. The armatures 34 to 36, inclusive, of the corresponding motors 22 to 24, inclusive, and the reactance device 9 are adjustably connected to the secondary winding 4 of the main transformer by means of the switching device 44.

Referring to Fig. 5, the voltage between the taps 44 and 43 of the transformer winding 4 is represented by the symbol $T3$, between the taps 43 and 42 by the symbol $T4$, between the taps 42 and 41 by the symbol $T5$. The voltage across the main field-magnet winding 25 of the motor 21 is represented by the vector $T5$. The current traversing the main field-magnet winding 25 is substantially 90° out of phase with the voltage of the transformer 4, and is represented by the vector $M21i$. The regenerative voltage across the armature 33 of the motor 21 is represented by the vector $A21cv$. This voltage $A21cv$ establishes a current that traverses the windings 26 to 28, inclusive, of the motors 22 to 24, inclusive, and is represented by the vector $A21I$. The reactive drop across the armature 33, field windings 29, 26, 27 and 28 and reactance device 39 is represented by vector $Raiv$, which together with vector $A21cv$ constitute the components of the voltage vector $T4$.

The induced voltage across the armatures 34 to 36, inclusive, of the motors 22 to 24, inclusive, is represented by the vector $Arcv$. The motor 21, therefore, regenerates with a substantially constant-torque characteristic in much the same manner as the motor 1 in Fig. 1, when the phase-converter 5 is inoperative, as heretofore described. The current traversing the armatures 34 to 36, inclusive, is represented by the vector $Ari$ and lags behind the voltage impressed upon the armatures 34 to 36, inclusive, because of the reactances of the compensating windings 34 to 36, inclusive, and of the reactance device 9. The reactance device 9 and the compensating field-magnet windings 30 to 32, inclusive, of the motors 22 to 24, inclusive, have a reactance voltage $Xrv$ that is equal to the voltage impressed across the terminals of the armatures 34 to 36, inclusive, of the motors 22 to 24, inclusive, and is substantially at right angles to the current traversing these armatures. The resultant of the voltage $Arcv$, which is generated by the armatures 34 to 36, inclusive, of the corresponding motors 22 to 24, inclusive, and of the reactance voltage $Xrv$ of the reactance device 9 and the compensating field-magnet windings 30 to 32, inclusive, is in phase with the voltage of the secondary winding 4 of the main transformer, being opposite in direction.

The braking effort of the motors 21 to 24, inclusive, may be increased by increasing the excitation of the main field-magnet winding 25 of the motor 21 or by shifting the taps that connect the armatures 34 to 36, inclusive, of the motors 22 to 24, inclusive, to the secondary winding 4 of the main transformer. The braking effort of the motors may be varied by changing the reactance values of the reactance devices 9 and 39. As explained above, the braking effort of the motor 21 is substantially constant, regardless of speed. With the motors 22 to 24, inclusive, the torque field flux increases with speed, the current $A_{ri}$ decreases with speed for a certain range and then increases, while the cosine of the angle between the flux and the current first increases and then decreases. The combined braking effort of the motors 21 to 24, inclusive, is substantially constant over the operating range of speed of the motors.

From the above description, it is apparent that I have provided a system of control for governing the operation of one or more single-phase commutator motors during regeneration to improve the power factor of the circuit, and that the torque of the motors may be inherently maintained constant; or, if desired, may be varied by the operator varying the connections of the motors to the source of supply.

While I have shown my invention in its preferred form, it is apparent that minor modifications may be made in the manner of securing the lag of the field-magnet winding current over 90 electrical degrees behind the voltage of the source of energy, without departing from the spirit of my invention. I desire, therefore, to be limited only by the scope of the appended claims.

I claim as my invention:—

1. In a motor-control system, the combination with a source of energy and a single-phase commutator motor having an armature and a field-magnet winding, of a circuit for energizing said winding from said source, and a reactance device independent of said circuit and in series relation with said armature to maintain the torque of said motor substantially constant during regeneration.

2. In a motor-control system, the combination with a source of energy and a single-phase commutator motor having an armature and a field-magnet winding, of a circuit for energizing said winding from said source, a reactance device independent of said circuit and in series relation with said armature, and means for varying the energization of said winding during regeneration.

3. In a motor-control system, the combination with a single-phase commutator motor having an armature and a field-magnet winding, of a reactance device in series relation with said armature and means comprising a phase-distorting device for varying the energization of said winding to improve the power factor of the current regenerated by said motor.

4. In a motor-control system, the combination with a single-phase commutator motor having an armature and a field-magnet winding, of a reactance device in series relation with said armature and means comprising a phase-converter for varying the flux of said winding to improve the power-factor of said motor during regeneration.

5. In a motor-control system, the combination with a single-phase commutator motor having an armature and a field-magnet winding, of a variable reactance device in series relation with said armature, and means for varying the flux of said winding to improve the power factor of said motor during regeneration.

6. In a motor-control system, the combination with a single-phase commutator motor having an armature and a field-magnet winding, of a variable reactance device in series relation with said armature to maintain constant torque, and a phase-converter in series relation with said winding during regeneration.

7. In a motor-control system, the combination with a single-phase commutator motor having an armature and a field-magnet winding, of a transformer having a plurality of taps for energizing said motor during motoring, a variable reactance device in series relation with said armature to maintain the torque of said motor substantially constant during regeneration, a phase-converter for varying the flux of said winding, and means for varying the connections of said armature and said phase-converter to said transformer.

8. In a motor-control system, the combination with an alternating-current dynamo-electric machine having an armature, a torque field-magnet winding and a compensating field magnet winding, of a source of electrical energy, a reactance device connected in series, with the motor armature and compensating field winding and across said power source, said reactance device being adapted to maintain the torque of the motor substantially constant during regeneration, a phase converter provided with primary and secondary windings, said secondary winding being connected in series with the motor torque field winding and to the power source to control the flux in the torque field winding.

9. In a motor-control system, the combination with an alternating-current dynamo-electric machine having an armature, a torque field magnet winding and a compensating field magnet winding, of a source of electrical energy, a reactance device connected in series with the motor armature and compensating field winding and across said power source, said reactance device being adapted to maintain the torque of the motor substantially constant during regeneration, a phase converter provided with primary and secondary windings, said secondary winding being connected in series with the motor torque field winding and to the power source to control the flux in the torque field winding, and means for connecting the primary winding of the converter to the power source.

In testimony whereof, I have hereunto subscribed my name this 18th day of April 1922.

MAURICE F. JONES.